United States Patent Office 3,519,644
Patented July 7, 1970

3,519,644
AZABICYCLOALKANE DERIVATIVES
Erhard Schenker, Basel, and Klaus Hasspacher, Riehen, Switzerland, assignors to Sandoz Ltd. (also known as Sandoz A.G.), Basel, Switzerland
No Drawing. Filed Apr. 11, 1967, Ser. No. 629,895
Claims priority, application Switzerland, Apr. 13, 1966, 5,343/66; Dec. 28, 1966, 18,627/66
Int. Cl. C07d 27/04
U.S. Cl. 260—326.86    3 Claims

ABSTRACT OF THE DISCLOSURE

The present invention provides compounds of formula:

$$\text{[bicyclic structure]} \quad \text{N—C(=NH)—NH—C(=NH)—NH—R}$$

in which R is hydrogen or lower alkyl, and the pharmaceutically acceptable acid addition salts thereof, which exhibit a pronounced blood sugar lowering effect. The production of these compounds is furthermore described.

---

The present invention relates to new biguanide derivatives and a process for their production.

The present invention provides heterocyclic biguanide derivatives of Formula I, $$\text{[bicyclic structure]} \quad \text{N—C(=NH)—NH—C(=NH)—NH—R} \quad \text{(I)}$$

in which R signifies a hydrogen atom or a lower alkyl radical, and their salts with inorganic or organic acids.

As used herein, the term "lower" designates alkyl radicals having from 1 to 4 carbon atoms inclusive.

The present invention further provides the following two processes for the production of compounds of Formula I and their acid addition salts:

(a) A compound of Formula II, $$\text{[bicyclic structure]—N—A} \quad \text{(II)}$$

and a compound of Formula III, $$\text{B—NH—R} \quad \text{(III)}$$

in which R has the above significance, and one of the symbols A and B significes a hydrogen atom, and the other symbol signifies the N-cyano-carboxamidine radical, are heated together in the presence of at least one equivalent of an acid, and, when the free base is desired, the compound of Formula I is liberated from the resulting acid addition salt with an alkali, and when an acid addition salt is required, salification is effected.

(b) 3-azabicyclo[3,2,0]heptane of Formula IV $$\text{[bicyclic structure]—NH} \quad \text{(IV)}$$

is reacted with a pyrazole derivative of Formula V, $$\text{[pyrazole structure with } R_1, R_2\text{]—N—C(=NH)—NH—C(=NH)—NH}_2 \quad \text{(V)}$$

to provide compounds of Formula I wherein R is hydrogen, and $R_1$ and $R_2$, which may be identical or different, each signify a hydrogen atom, a lower alkyl, aryl or aralkyl radical, in a suitable organic solvent in the presence of at least one equivalent of an acid, and, when the free base is desired, the compound of Formula I is liberated from the resulting acid addition salt with an alkali, and when an acid addition salt is required, salification is effected.

It should be noted, that the one equivalent of an acid may be introduced into the system as an acid addition salt of one of the reactants.

It should furthermore be noted that, in some cases, the anion of an acid addition salt of a compound of Formula I may be exchanged for other anions by a double decomposition reaction.

The process (a) may, for example, be effected in that an acid addition salt, preferably the hydrochloride, of the amino component [compounds II in which A=hydrogen or compounds III in which B=hydrogen] is heated together with the cyano component [compounds III in which B=the N-cyano-carboxamidine radical or compounds II in which A=the N-cyano-carboxamidine radical] to an elevated temperature until the mixture is thoroughly melted. The reaction in the resulting melted material takes place at between 140° and 200° C. and has a duration of 1 to 5 hours. The reaction mixture usually crystallizes completely or solidifies to a glassy mass upon cooling.

In accordance with another embodiment of this process the amino and the cyano component are heated at reflux for several hours in an aqueous acid solution, e.g. 3 N hydrochloric acid and the reaction mixture is subsequently concentrated by evaporating in a vacuum.

In accordance with the process (b), the pyrazole derivative of Formula V, e.g. N-guanyl-1-pyrazole-carboxamidine, in the form of an acid addition salt, e.g. the hydrochloride, is reacted with the compound of Formula IV in an inert organic solvent, at room temperature or at an elevated temperature, e.g. at the boiling temperature of the solvent. The reaction has a duration of 4 to 24 hours. Examples of suitable solvents are: methylene chloride, chloroform, lower alkanols, e.g. methanol or ethanol, and ethyl acetate.

In most cases, particularly when chloroform is used as solvent, the resulting acid addition salt of compound I crystallizes in the reaction mixture and may be isolated by filtration. If, however, no precipitate results during the course of the reaction, particularly when a lower alkanol is used as solvent, the clear solution is evaporated to dryness and the resulting acid addition salt of compound I is isolated by crystallization of the residue.

The above processes of the invention yield compounds of Formula I in the form of their acid addition salts which may be purified in manner known per se, e.g. by crystallization from suitable solvents, e.g. ethanol/ether, methanol or water. The corresponding free bases of Formula I may be obtained from the resulting salts by treating with an alkali, preferably an anion exchange resin which has been pretreated with an alkali. These free bases may be converted into their acid addition salts with inorganic or organic acids. Examples of acids for acid addition salt formation are: hydrochloric, hydrobromic, sulphuric, nitric, fumaric, maleic, tartaric, benzenesulphonic and N-cyclohexylsulphamic acid.

However, it is also possible to exchange the anion of the resulting salts by a double decomposition reaction. Thus, for example, by treating the hydrochlorides with aqueous silver sulphate or silver nitrate solution the corresponding sulphates or nitrates are obtained, in which case the difficultly soluble silver chloride results as by-product. The reaction of sulphates with aqueous barium chloride solution yields the corresponding hydrochlorides and the difficultly soluble barium sulphate in analogous manner.

The compounds of Formulae II and III used as starting materials in the process (a) of the invention are known, with the exception of $N^1$-cyano-3-azabicyclo[3,2,0]heptane-3-carboxamidine, which may be produced from 3-azabicyclo[3,2,0]heptane and dicyanimide as follows: sodium dicyanimide and 3-azabicyclo[3,2,0]heptane hydrochloride are heated, for example, to the boil at reflux for about five hours in a suitable solvent, e.g. n-butanol.

The pyrazole derivatives of Formula V used as starting materials in the process (b) of the invention are new, except for the compounds in which $R_1$ and $R_2$ signify lower alkyl radicals. These compounds may be produced in that a pyrazole derivative of Formula VI,

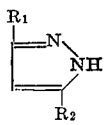
(VI)

in which $R_1$ and $R_2$ have the above significance, is reacted with a cyano-guanidine of Formula VII,

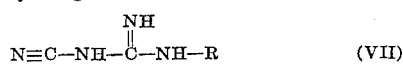
(VII)

in which R has the above significance, in the presence of at least one equivalent of an acid. This reaction may be effected in that either an acid addition salt, e.g. the hydrochloride, of the pyrazole derivative VI is melted at 140–200° C. together with the cyano-guanidine of Formula VII or the pyrazole derivative VI is heated to the boil at reflux with the cyano-guanidine VII in an aqueous acid, e.g. 3 N hydrochloric acid.

Pyrazole derivatives of Formula V, in which R signifies hydrogen, may also be obtained as follows:

An acid addition salt of a pyrazole-carboxamidine of Formula VIII,

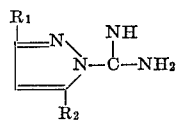
(VIII)

in which $R_1$ and $R_2$ have the above significance, is treated in an organic solvent which is inert under the reaction conditions, e.g. chloroform, with ½ equivalent of a tertiary or a sterically hindered secondary or primary organic nitrogen compound, e.g. triethylamine or 1-amino-2,6-dimethyl-piperidine, for about 2 hours and preferably at the boiling temperature of the solvent. One equivalent of the acid addition salt of the pyrazole-carboxamidine VIII used yields ½ equivalent of compound V (as acid addition salt), in which R signifies hydrogen, and ½ equivalent of the corresponding pyrazole derivative of Formula VI unsubstituted in the 1-position.

The starting materials of Formulae VI and VIII used for the production of the pyrazole derivative V may be obtained in manner known per se from 1,3-dicarbonyl compounds of Formula IX,

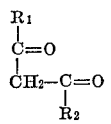
(IX)

in which $R_1$ and $R_2$ have the above significance, or from the corresponding acetals by reacting with hydrazine or amino-guanidine.

The biguanide derivatives of Formula I have hitherto not been described in the literature. They are characterized by valuable pharmacodynamic properties. Thus, in tests effected with diabetic animals they exhibit a pronounced blood sugar lowering effect of long duration, which occurs even upon administration of low doses. Their toxicity is relatively low as compared with other guanidine compounds. The compounds of the invention are therefore indicated for use in the treatment of Diabetes mellitus, in which case they may be used on their own or in admixture with other medicaments having an antidiabetic effect, e.g. sulphonyl-ureas, and are preferably administered per os. A suitable average daily dose is 50–1000 mg.

In order to produce suitable medicinal preparations the biguanide derivatives of the invention or their water-soluble, physiologically tolerated acid addition salts are worked up with the usual inorganic or organic adjuvants which are inert and physiologically acceptable. Suitable medicinal preparations are, for example, tablets, dragées, capsules, syrups, injectable solutions. Aside from adjuvants, e.g. polyvinyl pyrrolidone, methyl cellulose, talcum, maize starch, magnesium stearate, stearic acid and sorbic acid, the preparations may also contain suitable preserving agents, sweetening and colouring substances and flavourings.

The term "in manner known per se" as used herein designates methods in use or described in the literature on the subject.

In the following non-limitative examples all temperatures are indicated in degrees centigrade and are uncorrected.

EXAMPLE 1

N-guanyl-3-azabicyclo[3,2,0]heptane-3-carboxamidine 13.3 g. of 3-azabicyclo[3,2,0]heptane hydrochloride (melting point 200°) are triturated with 8.4 g. of dicyano diamide and the mixture is heated to 160–180° in an oil bath for 2 hours. After cooling, the sodified melted material is pulverized and recrystallized from ethanol/ether. The hydrochloride of the compound mentioned in the heading has a melting point of 220°.

EXAMPLE 2

N-($N^1$-methylguanyl)-3-azabicyclo[3,2,0]heptane-3-carboxamidine

A mixture of 3.3 g. of 3-azabicyclo[3,2,0]heptane hydrochloride and 2.5 g. of methyl-dicyano diamide (melting point 93–94°) is melted by heating and heated to 160° for 3 hours. The melted material gradually solidifies in crystalline form and is recrystallized from ethanol/ether after cooling. The hydrochloride of the compound indicated in the heading has a melting point of 223–225°.

EXAMPLE 3

N-($N^1$-methylguanyl)-3-azabicyclo[3,2,0]heptane-3-carboxamidine 3.0 g. of methylamine hydrochloride are mixed well with 7.0 g. of $N^1$-cyano - 3-azabicyclo[3,2,0]heptane-3-carboxamidine and the mixture is heated to 190° for 3 hours, whereby the material melts completely. After cooling, the glassy, solidified mass is pulverized and recrystallized from ethanol/ether. The hydrochloride of the compound indicated in the heading has a melting point of 223–225°.

The $N^1$ - cyano - 3 - azabicyclo[3,2,0]heptane-3-carboxamidine used as starting material is produced as follows:

13.0 g. of sodium dicyanimide and 19.4 g. of 3-azabicyclo[3,2,0]heptane hydrochloride are heated at reflux in 200 ml. of n-butanol whilst stirring for 5 hours. After cooling, the reaction mixture is filtered and the filter residue extracted with hot ethanol. $N^1$-cyano-3-azabicyclo[3,2,0]heptane-3-carboxamidine, having a melting point of 215–217°, crystallizes upon cooling the filtrate.

EXAMPLE 4

N-guanyl-3-azabicyclo[3,2,0]heptane-3-carboxamidine 0.97 g. of 3-azabicyclo[3,2,0]heptane and 1.89 g. of N-guanyl - 1-pyrazole-carboxamidine hydrochloride are heated to the boil at reflux in 40 ml. of ethanol for 6 hours. The yellowish brown solution is concentrated by evaporation in a vacuum and the resulting residue is crystallized from ethanol/ether after treating with active charcoal. The hydrochloride of the compound indicated in the heading has a melting point of 220°

The N - guanyl-1-pyrazole-carboxamidine hydrochloride used as starting material may, for example, be produced as follows:

12.5 g. of 1-pyrazole-carboxamidine hydrochloride are suspended in 40 ml. of chloroform and 4.3 g. of triethyl amine, dissolved in 10 ml. of chloroform, are added dropwise during the course of 5 minutes. While the 1-pyrazole-carboxamidine hydrochloride dissolves slowly by the action of the base, N-guanyl-1-pyrazole-carboxamidine hydrochloride commences to crystallize. The mixture is heated to the boil at reflux for 2 hours, filtration is effected and the filter residue is crystallized thrice from ethanol/ether. Melting point 172–174°.

EXAMPLE 5

Galenical preparation

| | Tablets (g.) |
|---|---|
| N-guanyl - 3 - azabicyclo[3,2,0]heptane-3-carboxamidine hydrochloride (compound of Example 1) | [1] 0.120 |
| Dimethyl silicone oil | 0.0005 |
| Magnesium stearate | 0.0010 |
| Polyethylene glycol 6000 | 0.0015 |
| Polyvinyl pyrrolidone | 0.0040 |
| Talcum | 0.0050 |
| Maize starch | 0.010 |
| Lactose | 0.0380 |
| For a tablet of | 0.180 |

[1] Corresponds to 0.10 g. of the free base.

What is claimed is:

1. A compound selected from the group consisting of a compound of formula:

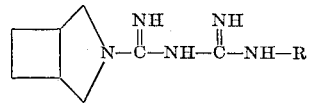

in which R is hydrogen or lower alkyl, and a pharmaceutically acceptacle acid addition salt thereof.

2. A compound according to claim 1, in which the compound is N - guanyl-3-azabicyclo[3,2,0]heptane-3-carboxamidine.

3. A compound according to claim 1, in which the compound is N - ($N^1$ - methylguanyl) - 3 - azabicyclo[3,2,0]heptane-3-carboxamidine.

References Cited

UNITED STATES PATENTS 3,304,306   2/1967   Werner et al. ____ 260—326.86

ALEX MAZEL, Primary Examiner

J. A. NARCAVAGE, Assistant Examiner

U.S. Cl. X.R.

424—274; 260—310, 326.3